US010623997B2

(12) United States Patent
Fersman et al.

(10) Patent No.: US 10,623,997 B2
(45) Date of Patent: Apr. 14, 2020

(54) MOBILE TERMINAL, A BUFFERING MODULE, AND METHODS THEREIN FOR UPLOADING A FILE IN A COMMUNICATIONS NETWORK

(71) Applicant: Telefonaktiebolaget LM Ericsson (publ), Stockholm (SE)

(72) Inventors: Elena Fersman, Stockholm (SE); Mikael Anneroth, Enebyberg (SE); Rafia Inam, Västerås (SE); Magnus Olsson, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/067,187

(22) PCT Filed: Feb. 5, 2016

(86) PCT No.: PCT/SE2016/050089
§ 371 (c)(1),
(2) Date: Jun. 29, 2018

(87) PCT Pub. No.: WO2017/135855
PCT Pub. Date: Aug. 10, 2017

(65) Prior Publication Data
US 2019/0014502 A1   Jan. 10, 2019

(51) Int. Cl.
*H04W 28/14* (2009.01)
*H04L 29/08* (2006.01)
(Continued)

(52) U.S. Cl.
CPC .......... *H04W 28/14* (2013.01); *H04L 67/04* (2013.01); *H04L 67/06* (2013.01); *H04L 67/10* (2013.01);
(Continued)

(58) Field of Classification Search
CPC ... H04W 28/14; H04W 72/0413; H04W 8/04; H04W 84/005; H04W 80/04;
(Continued)

(56) References Cited

U.S. PATENT DOCUMENTS 8,238,361 B2 * 8/2012 Carlsson ............... H04L 47/10
370/232
8,565,227 B2 * 10/2013 Nakata ............... H04L 41/048
370/389
(Continued)

FOREIGN PATENT DOCUMENTS

WO   2011063825 A1   6/2011
WO   2013088186 A1   6/2013
(Continued)

*Primary Examiner* — Brian T O Connor
(74) *Attorney, Agent, or Firm* — Murphy, Bilak & Homiller, PLLC

(57) ABSTRACT

According to a first aspect of embodiments herein, the object is achieved by a method performed by a mobile terminal for uploading a file in a communications network. After the mobile terminal (201) has selected a buffering module to be used for uploading the file, it sends (202) to the selected buffering module, the file to be uploaded in the communications network. The mobile terminal receives (204) a notification from the selected buffering module. The notification is about an estimated time to any one or more out of: upload start and upload end. The mobile terminal then refrains (205) from re-sending to the selected buffering module the file to be uploaded in the communications network until the estimated time to any one or more out of: upload start and upload end has expired.

12 Claims, 8 Drawing Sheets

(51) Int. Cl.

| | |
|---|---|
| *H04L 29/14* | (2006.01) |
| *H04L 29/06* | (2006.01) |
| *H04W 80/04* | (2009.01) |
| *H04L 12/24* | (2006.01) |
| *H04W 84/00* | (2009.01) |
| *H04W 8/04* | (2009.01) |
| *H04W 52/50* | (2009.01) |
| *H04W 72/04* | (2009.01) |
| *H04L 12/863* | (2013.01) |
| *H04W 28/02* | (2009.01) |
| *H04L 12/835* | (2013.01) |
| *H04L 12/801* | (2013.01) |
| *H04L 12/825* | (2013.01) |

(52) U.S. Cl.
CPC ............ *H04L 67/125* (2013.01); *H04L 67/32* (2013.01); *H04L 67/325* (2013.01); *H04L 69/28* (2013.01); *H04L 69/40* (2013.01); *H04L 41/048* (2013.01); *H04L 47/10* (2013.01); *H04L 47/266* (2013.01); *H04L 47/30* (2013.01); *H04L 47/50* (2013.01); *H04L 67/2842* (2013.01); *H04W 8/04* (2013.01); *H04W 28/0247* (2013.01); *H04W 28/0278* (2013.01); *H04W 28/0289* (2013.01); *H04W 52/50* (2013.01); *H04W 72/0413* (2013.01); *H04W 80/04* (2013.01); *H04W 84/005* (2013.01)

(58) Field of Classification Search
CPC ............ H04W 52/50; H04W 28/0289; H04W 28/0278; H04W 28/0247; H04L 69/28; H04L 67/06; H04L 69/40; H04L 67/10; H04L 67/32; H04L 67/04; H04L 67/325; H04L 67/125; H04L 67/2842; H04L 41/048; H04L 47/50; H04L 47/30; H04L 47/266; H04L 47/10
See application file for complete search history.

(56) References Cited

U.S. PATENT DOCUMENTS

| | | | |
|---|---|---|---|
| 9,237,586 B2 * | 1/2016 | Liu | H04W 74/0833 |
| 9,246,974 B2 * | 1/2016 | Stoop | H04L 67/02 |
| 9,432,402 B1 * | 8/2016 | McKeeman | G06F 16/13 |
| 9,930,100 B2 * | 3/2018 | Stoop | H04L 67/02 |
| 10,069,894 B2 * | 9/2018 | Liao | H04L 67/06 |
| 2002/0032865 A1 | 3/2002 | Golubchik et al. | |
| 2005/0209927 A1 | 9/2005 | Aaltonen et al. | |
| 2010/0158032 A1 * | 6/2010 | Carlsson | H04L 47/10 370/412 |
| 2012/0089706 A1 * | 4/2012 | Collins | H04N 1/00244 709/219 |
| 2012/0300649 A1 * | 11/2012 | Parmar | H04L 43/0888 370/252 |
| 2013/0282869 A1 * | 10/2013 | Mate | H04L 67/325 709/219 |
| 2014/0071910 A1 * | 3/2014 | Liu | H04W 74/0833 370/329 |
| 2014/0074986 A1 * | 3/2014 | Stoop | H04L 67/02 709/219 |
| 2014/0269270 A1 | 9/2014 | Wolcott et al. | |
| 2016/0006791 A1 * | 1/2016 | Ladiwala | H04W 4/023 709/219 |
| 2016/0080471 A1 * | 3/2016 | Stoop | H04L 67/02 709/219 |
| 2017/0013045 A1 * | 1/2017 | Predmore, II | H04L 67/06 |
| 2017/0111307 A1 * | 4/2017 | Nomura | H04L 51/32 |
| 2018/0219828 A1 * | 8/2018 | Nomura | H04L 51/32 |

FOREIGN PATENT DOCUMENTS

| | | |
|---|---|---|
| WO | 2014037762 A1 | 3/2014 |
| WO | 2015187078 A1 | 12/2015 |

* cited by examiner

MOBILE TERMINAL, A BUFFERING MODULE, AND METHODS THEREIN FOR UPLOADING A FILE IN A COMMUNICATIONS NETWORK

TECHNICAL FIELD

Embodiments herein relate to a mobile terminal, a method therein, a computer program and a carrier comprising the computer program. In particular, they relate to uploading a file in a communications network.

Further, embodiments herein relate to a buffering module, a method therein, a computer program and a carrier comprising the computer program. In particular, they relate to uploading a file in a communications network.

BACKGROUND

Wireless devices or mobile terminals for communication are also known as e.g. User Equipments (UE), mobile terminals, wireless terminals and/or mobile stations. Mobile terminals are enabled to communicate wirelessly in a communication network such as a mobile network, sometimes also referred to as a wireless communications system, a cellular radio system or cellular networks. The communication may be performed e.g. between two mobile terminals, between a mobile terminal and a regular telephone and/or between a mobile terminal and a server, such as server providing video streaming service, via a Radio Access Network (RAN) and possibly one or more core networks, comprised within the communications network.

Mobile terminals may further be referred to as mobile telephones, cellular telephones, computers, or surf plates with wireless capability, just to mention some further examples. The mobile terminals in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. The base stations and wireless devices involved in communication may also be referred to as transmitter-receiver pairs, where the respective transmitter and receiver in a pair may refer to a base station or a wireless device, depending on the direction of the communication. Two mobile terminals involved in D2D communication may also be referred to as a transmitter-receiver pair. In the context of this disclosure, the expression Downlink (DL) is used for the transmission path from the base station to a wireless device. The expression Uplink (UL) is used for the transmission path in the opposite direction i.e. from the wireless device to the base station.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

Communications network congestion is often observed in the situations of big events such as e.g. concerts and football games, where thousands of mobile terminals in close proximity from each other simultaneously start uploading data, such as photos or videos taken at the time of the big event. As a result, the communications network performance goes down, and the users of the mobile terminals perceive degradation of upload service when it takes too long to upload a file such as e.g. a video.

SUMMARY

It is therefore an object of embodiments herein to improve the performance in a communications network, specifically when being congested.

According to a first aspect of embodiments herein, the object is achieved by a method performed by a mobile terminal for uploading a file in a communications network. After the mobile terminal has selected a buffering module to be used for uploading the file, it sends to the selected buffering module, the file to be uploaded in the communications network. The mobile terminal receives a notification from the selected buffering module. The notification is about an estimated time to any one or more out of: upload start and upload end.

The mobile terminal then refrains from re-sending to the selected buffering module the file to be uploaded in the communications network until the estimated time to any one or more out of: upload start and upload end has expired.

According to a second aspect of embodiments herein, the object is achieved by a computer program comprising instructions, which when executed by at least one processor, cause the at least one processor to perform actions according to any of the actions above.

According to a third aspect of embodiments herein, the object is achieved by a carrier comprising the computer program. The carrier is one of an electronic signal, an optical signal, an electromagnetic signal, a magnetic signal, an electric signal, a radio signal, a microwave signal, or a computer-readable storage medium.

According to a forth aspect of embodiments herein, the object is achieved by a method performed by a buffering module for uploading a file in a communications network for a mobile terminal. The buffering module receives from the mobile terminal, a file to be uploaded in the communications network.

The buffering module buffers the file in a queue among any other files to be uploaded for any mobile terminal. The buffering module estimates a time to any one or more out of:

upload start and upload end, of the file and then sends a notification to the mobile terminal. The notification is about the estimated time to any one or more out of: upload start and upload end of the file.

According to a fifth aspect of embodiments herein, the object is achieved by a computer program comprising instructions, which when executed by at least one processor, cause the at least one processor to perform actions according to any of the actions above.

According to a sixth aspect of embodiments herein, the object is achieved by a carrier comprising the computer program. The carrier is one of an electronic signal, an optical signal, an electromagnetic signal, a magnetic signal, an electric signal, a radio signal, a microwave signal, or a computer-readable storage medium.

According to a seventh aspect of embodiments herein, the object is achieved by a mobile terminal, for uploading a file in a communications network. The mobile terminal is configured to:

Select a buffering module to be used for uploading the file, send to the selected buffering module, the file to be uploaded in the communications network, receive from the selected buffering module, a notification about an estimated time to any one or more out of: upload start and upload end, and refrain from re-sending to the selected buffering module the file to be uploaded in the communications network until the estimated time to any one or more out of: upload start and upload end has expired.

According to an eighth aspect of embodiments herein, the object is achieved by a buffering module, for uploading a file in a communications network for a mobile terminal. The buffering module is configured to:

Receive from the mobile terminal, a file to be uploaded in the communications network, buffer the file in a queue among any other files to be uploaded for any mobile terminal, estimate time to any one or more out of: upload start and upload end, of the file, and send to the mobile terminal a notification about the estimated time to any one or more out of: upload start and upload end of the file.

Since the time to upload is estimated by the buffering module and notified to the mobile terminal, unnecessary reseedings of the file to uploaded can be avoided resulting in less congestion, which in turn improves the performance in the communications network An advantage of embodiments herein is that makes the upload of the file transparent and as such more efficient. Further, they aim at making the transfer more transparent to the user of the mobile terminal by informing that the transfer actually is taken care of, which both avoids that the user in lack of acknowledged media transfer resends his media thereby causing even more congestion but also is a psychological relief for the user.

BRIEF DESCRIPTION OF THE DRAWINGS

Examples of embodiments herein are described in more detail with reference to attached drawings in which.

DETAILED DESCRIPTION

As part of developing embodiments herein a problem was first identified and will be discussed below:

As mentioned above, in communications network congestion, where thousands of mobile terminals in close proximity from each other simultaneously start uploading data, the communications network performance goes down, and the users of the mobile terminals perceive degradation of upload service when it takes too long to upload a file such as e.g. a video.

A problem is that the communications network starts treating all the requests simultaneously, and the mobile terminals do not get any feedback on when they can expect the upload to start and to finish. In existing solutions, different type of content is mapped to different network bearers, for example IMS signaling is mapped to the highest priority bearer, and the HTTP traffic is mapped to the lowest priority bearer. Currently, all HTTP requests are handled by the communications network simultaneously, and at the same priority level. There is no mechanism to deal with many simultaneous requests, as they will be handled by the network in parallel, with the same priority, and in best-effort fashion. Currently, users are given no transparency with respect to the file uploads to the network. The file update process is hidden from the user of the mobile terminal, users are not provided about the status of the file upload. Since the user is unaware about the status of file uploading process, he/she gets frustrated and resends the file again to upload.

Embodiments herein provide transparency buffering of content and efficient file upload that are suitable in congested communications networks.

Figure 1A:
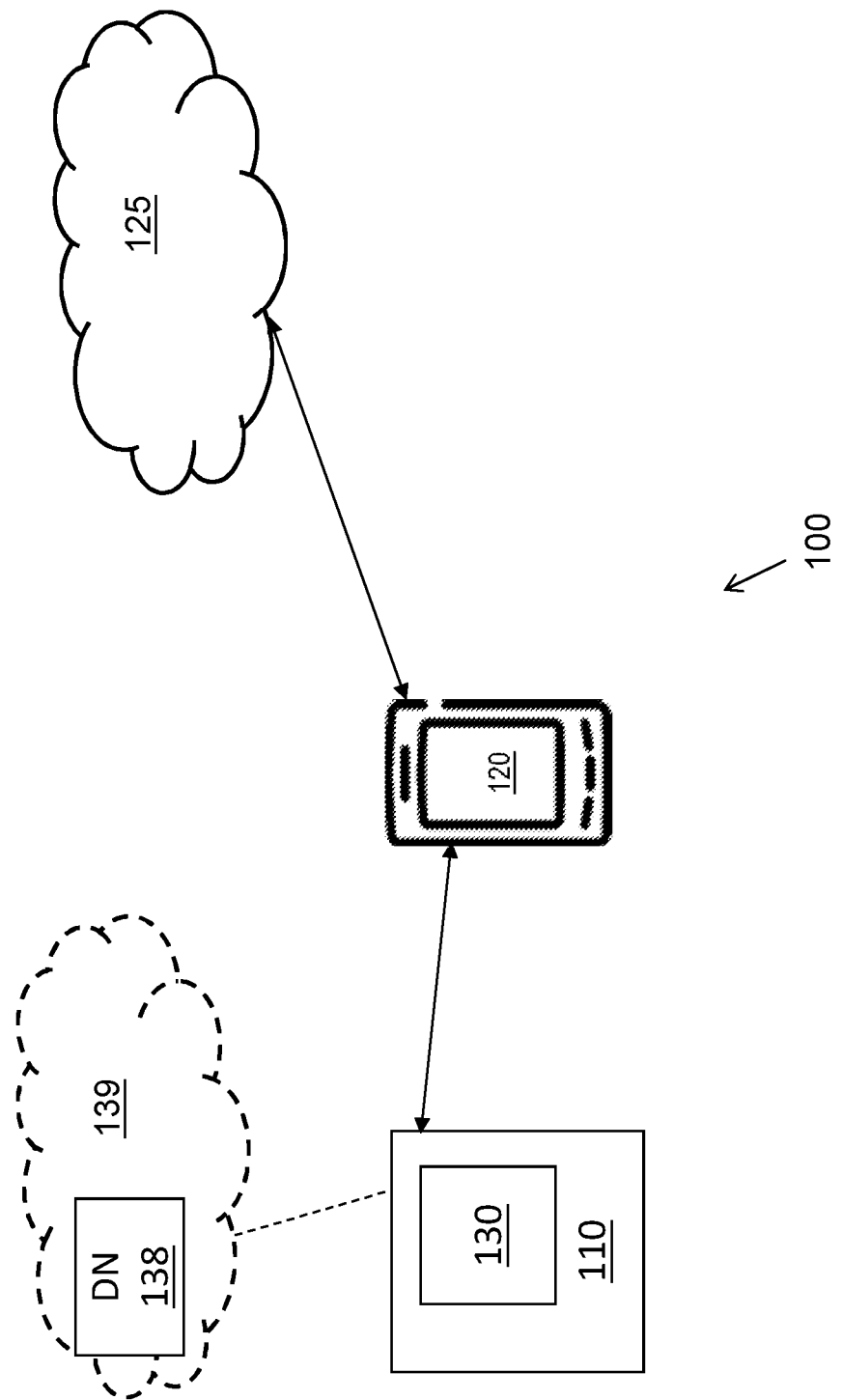
FIG. 1a is a schematic block diagram illustrating embodiments of a communications network.
Figure 1B:
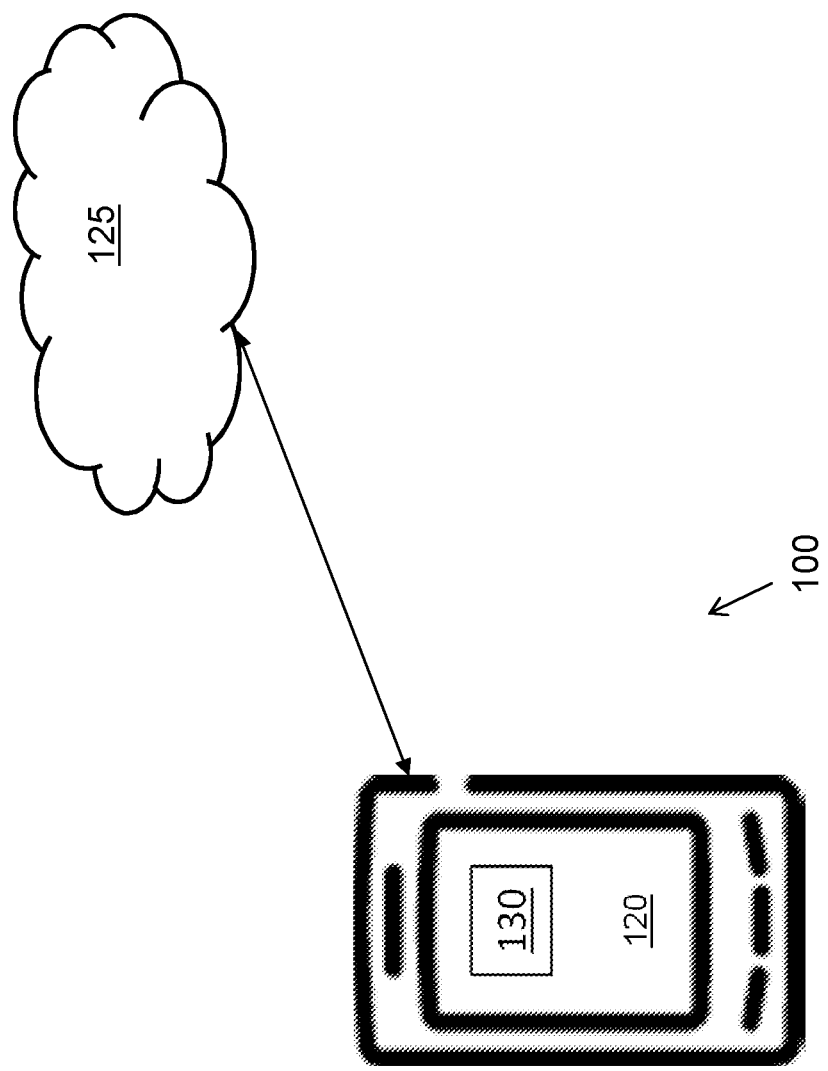
FIG. 1b is a schematic block diagram illustrating embodiments of a communications network.

FIGS. 1a and 1b depict an example of a communications network 100 in which embodiments herein may be implemented. The communications network 100 may comprise any wired and wireless network, such as any one or more out of: LTE, GSM, GSM EDGE Radio Access Network (GERAN), Wi Fi, Wireless Local Area network (WLAN), WiMax, Code Divisional Multiple Access (CDMA) 2000, LTE-NX, Massive MIMO systems etc. EDGE is the abbreviation for Enhanced Data Rates for GSM Evolution, and NX LTE means next-generation 5G radio access technology.

The communications network 100 may comprise a capillary network. A capillary network is a local communications network that uses short-range radio-access technologies to provide local connectivity to things and devices such as e.g. mobile terminals for example WiFi and/or Bluetooth and/or Light Fidelity (LiFi) etc. Capillary networks use short-range radio to provide local connectivity connecting to the global communication infrastructure through a capillary gateway. Capillary networks are a smart way to connect the billions of things and devices using short-range radio connectivity to gateways. The gateways then use 3GPP radio for backhaul between the gateway and the mobile network.

A plurality of network nodes operates in the wireless communications network 100 whereof one, a network node 110 is depicted in FIGS. 1a and 1b. The network node 110 may e.g. be a gateway node in the communications network 100 or a gateway in a capillary network for example in the communications network 100. The network node 110 may comprise a buffering module 130 operating in the communications network 100. This will be described below. The network node 110 comprises a network function that has a buffering functionality and that may be connected to a cloud 139 to upload the content and may also be connected to a local capillary network to receive the file contents.

One or more mobile terminals are operable in the communications network 100, whereof one a mobile terminal 120 is shown in FIGS. 1a and 1b.

The mobile terminal comprises one or more applications related to communication via the communications network 100 e.g. to a network 125 such as e.g. the Internet or the Cloud. Such applications may e.g. be e-mail, twitter, Facebook, web browser, email client, calendar, mapping program, games, and an app for buying music or other media. The mobile terminal 120 is capable of uploading files such as media in the communications network 100 to the network 125 such as e.g. the Internet or the cloud 139.

The term mobile terminal when used herein may e.g. refer to a wireless device, a mobile wireless terminal or a wireless terminal, a mobile phone, a target device, a computer such as e.g. a laptop, a Personal Digital Assistants (PDAs) or an iPad, a tablet computer, sometimes referred to as a surf plate, with wireless capability, a smart phone, Laptop Embedded Equipment (LEE), Laptop Mounted Equipment (LME), Universal Serial Bus (USB) dongles or any other radio network units capable to communicate over a radio link in a wireless communications network.

A buffering module 130 operates in the communications network 100 and serves the mobile terminal 120. In some embodiments, the buffering module 130 may be comprised in the network node 110 which e.g. may be a gateway in a capillary network in the communications network. This is shown in FIG. 1a. An alternative to being comprised in a network node the buffering module 130 is to be a distributed implementation using computing power of the mobile terminal 120. Thus in alternative embodiments the buffering module 130 is comprised in the mobile terminal 120 which is shown in FIG. 1b. The buffering module 130 may be e.g. referred to as a queue manager.

The buffering module 130 comprises a system that buffers mobile terminals' files in a queue to be uploaded, e.g. in First In First Out (FIFO order, other scheduling techniques, for example depending on the size of the file, may also be applicable.

A method for uploading a file in a communications network 100, is performed by the the buffering module 130 as will be described below. As an alternative, a Distributed Node (DN, such as the network node 138, and functionality, e.g. comprised in a cloud 139 as shown in FIG. 1a, may be used for performing the method.

Embodiments herein let the mobile terminal know when the upload is expected to start and/or finish, even if it happens ahead in time.

According to an example embodiment, when an upload is initiated in the mobile terminal 120, the buffering module 130 acknowledges that the file is received, and that the file is put into the queue along with notifying the mobile terminal 120.

The buffering module 130 then instantaneously notifies the mobile terminals 120 when the upload is estimated to start/end, and may then send a notification when the upload is completed.

Below embodiments of a method will be described, first in the view of the mobile terminal 120 and then in the view of the buffering module 130.

Figure 2:
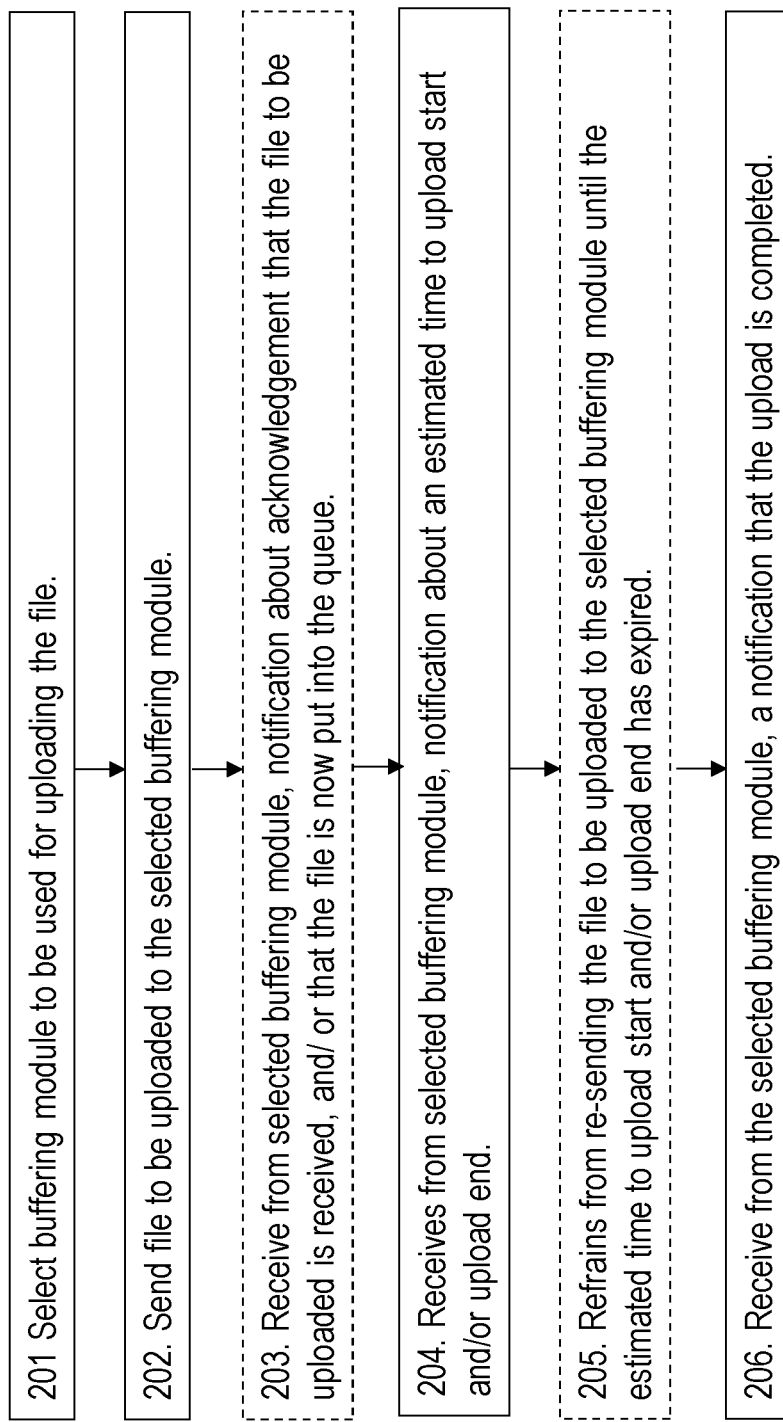
FIG. 2 is a flowchart depicting embodiments of a method in an associating unit.

Example embodiments of a method performed by a mobile terminal 120, for uploading a file in a communications network 100 will now be described with reference to a flowchart depicted in FIG. 2. As Mentioned above the buffering module 130 may e.g. operates in the in mobile terminal 120. In some other embodiments, the buffering module 130 operates in the communications network 100, such as e.g. in the distributed network node 118.

In the examples herein the communications network 100 may to some degree be congested. In an example scenario, the mobile terminal 120 wishes to upload a file to the network 125 via the communications network 100. The file may e.g. be a media file such as a video, a picture, an audio, e.g. of a song, or some text describing the status of the user, or a combination, like video with a text description, etc.

The method comprises the following actions, which actions may be taken in any suitable order. Actions that are optional are presented in dashed boxes in FIG. 2.

Action 201

In an example scenario, the mobile terminal 120 wishes to upload a file in the network 125 via the communications network 100. Since the communications network 100 may be congested some support is needed. To be served with information about the upload time of the file, the upload procedure is performed via a suitable buffering module 130 according to embodiments herein. To find the buffering module to be selected by the mobile, the buffering module 130 may listen for broadcast signals such as beacon signals from the mobile terminal 120. This may be performed by Actions 301 and 302, and is described more in detail below. Thus the mobile terminal 120 selects the buffering module 130 to be used for uploading the file.

In some embodiments the selecting of the buffering module 130 is performed when the communications network 100 is congested, but it may also be performed any time the mobile terminal 120 wishes to upload a file in the network 125 via the communications network 100 regardless of the network state.

In some embodiments, the mobile terminal 120 comprises a specific application for uploading files. The application may be associated with a number of pre-configured buffering modules in different geographical locations. In these embodiments, the mobile terminal 120 may select the buffering module 130 to be used for uploading the file by activating the specific application and selecting the buffering module 130 in the closest geographical proximity.

In some alternative embodiments, the mobile terminal 120 may select a buffering module 130 to be used for uploading the file is by sending a broadcast signal to be received and responded to by the buffering module 130.

Action 202

When the buffering module 130 is selected, the mobile terminal 120 sends to the selected buffering module 130, the file to be uploaded in the communications network 100. In some embodiments the file to be uploaded in the communications network 100, is sent to the selected buffering module 130 via a capillary network, e.g. in the communications network 100.

Action 203

In some embodiments, when the buffering module 130, has received the file to be uploaded, it notifies the mobile terminal 120.

Therefore the mobile terminal 120 may receive from the selected buffering module 130, a notification about any one or more out of: an acknowledgement that the file to be uploaded is received, and that the file is now put into the queue. It makes the upload more transparent to the user of the mobile terminal 120 by informing that the file to be uploaded actually is taken care of, which is a relief for the user of the mobile terminal 120.

Action 204

According to an example scenario, when the buffering module 130 has received the file to be uploaded it buffers the file in the queue. The buffering module 130 then estimates the time to upload start and/or the time to upload end and notifies the mobile terminal 120. It may send feedback to the mobile terminal 120 by e.g. acknowledge to the mobile terminal 120 that its file is in a queue and that the upload of the file will be taken care of in next x time. Thus the mobile terminal 120 receives from the selected buffering module 130, a notification about an estimated time to any one or more out of: upload start and upload end. E.g. a simple status message may be "the file will 2 seconds to upload" etc.) This makes the file upload procedure transparent to the user of the mobile terminal 120 by receiving information about when the file actually will be uploaded, which is a relief for the user of the mobile terminal 120.

Note that the notification in Action 202 may be received together with the notification in Action 204, i.e. at the same time.

Action 205

Upon receiving the notification about the estimated time to upload start and/or upload end the mobile terminal 120 can avoid to re-sending the file to be uploaded thereby causing even more congestion. The mobile terminal 120 thus refrains from re-sending to the selected buffering module 130 the file to be uploaded in the communications network 100 until the estimated time to any one or more out of: upload start and upload end has expired.

This makes the upload of the file as such more efficient and the communications network 100 will not be even more congested thus improving the performance in the communications network in particular when the communications network 100 is congested.

Action 206

The buffering module 130 then uploads the file to the network 125 such as e.g. the Internet or the cloud. The mobile terminal 120 may then, when the upload of the file is completed, receive from the selected buffering module 130, a notification that the upload is completed.

Now the method will be described from the perspective of the buffering module 130. Please consider the examples described above.

Figure 3:
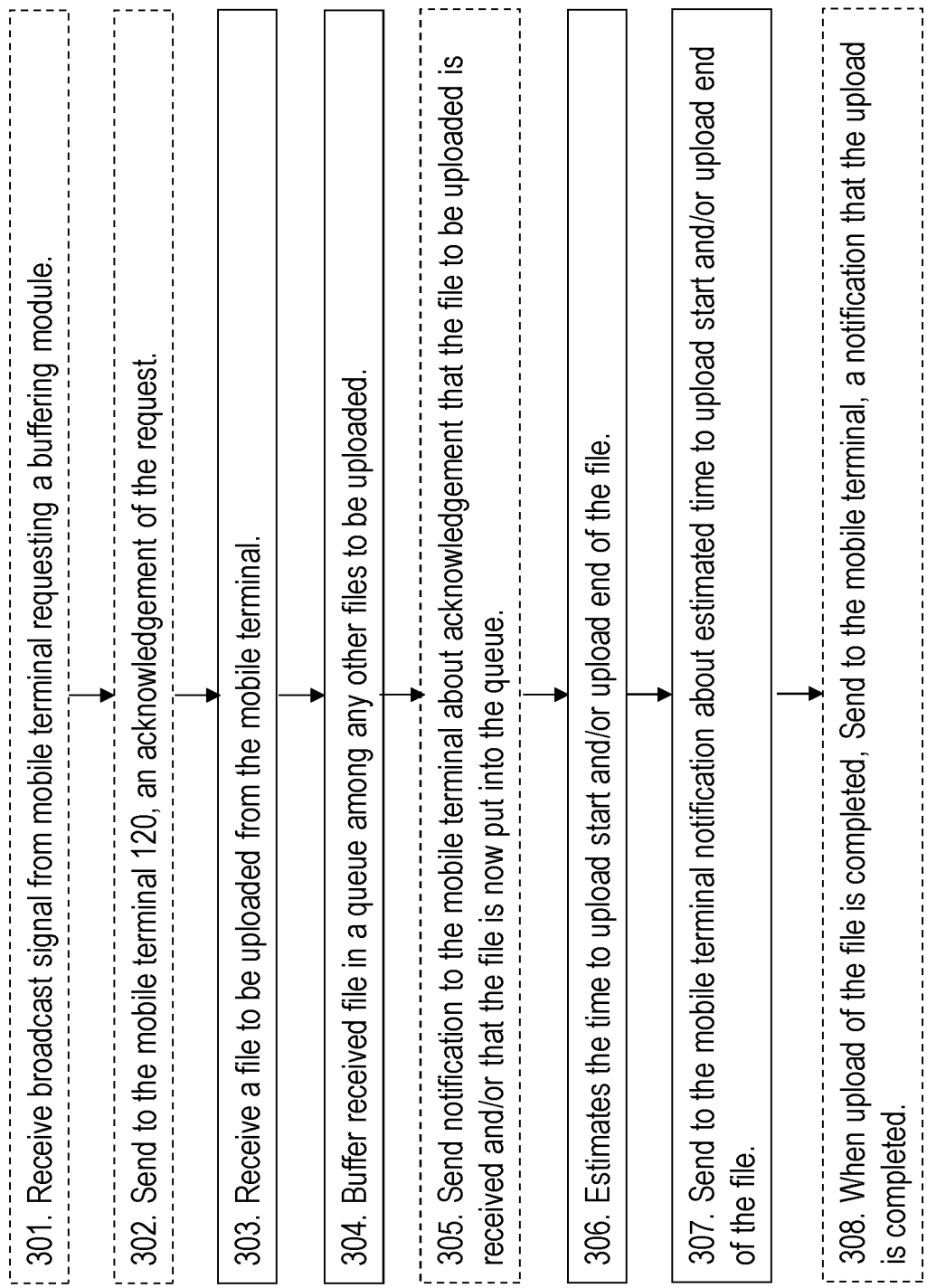
FIG. 3 is a flowchart depicting embodiments of a method in a mobile terminal.

Example embodiments of a method performed by the buffering module 130, for uploading a file in a communications network 100 for a mobile terminal 120 will now be described with reference to a flowchart depicted in FIG. 3. As mentioned above, the buffering module 130 may e.g. operate in the in mobile terminal 120. In some example embodiments, the buffering module 130 operates in the communications network 100.

In the examples herein the communications network 100 may be to some degree congested.

The method comprises the following actions, which actions may be taken in any suitable order. Actions that are optional are presented in dashed boxes in FIG. 4.

Action 301

As mentioned above, the buffering module 130 has been selected by the mobile terminal 120 that requires some support for uploading a file in the communications network 100. To find the buffering module to be selected the mobile the buffering module 130 may listen for broadcast signals such as beacon signals from the mobile terminal 120. This may be performed by Actions 301 and 302, and is described more in detail below.

The buffering module 130 thus receives from the mobile terminal 120 a broadcast signal indicating a request that the mobile terminal 120 wishes to select a buffering module to be used for uploading the file.

Action 302

In the embodiments, wherein Action 301 is performed, the buffering module 130 sends to the mobile terminal 120, an acknowledgement of the request. In this way the mobile terminal 120 has identified the buffering module 130 and may select the buffering module 130 for its file upload.

Action 303

When the buffering module has been selected by the mobile terminal 120 for support, the buffering module 130 receives from the mobile terminal 120, a file to be uploaded in the communications network 100.

The file to be uploaded in the communications network 100 may be received from the mobile terminal 120 when the communications network 100 is congested.

In some embodiments, e.g. wherein the buffering module 130 operates in the communications network 100 the file to be uploaded in the communications network 100, may be received from the mobile terminal 120 via a capillary network. E.g. via WiFi or Bluetooth Action 304

The buffering module 130 then buffers the file in a queue among any other files to be uploaded for any mobile terminal.

Action 305

In some embodiments, the buffering module 130 sends a notification to the mobile terminal 120. The notification is about any one or more out of: an acknowledgement that the file to be uploaded is received, and that the file is now put into the queue. As mentioned above, it makes the upload more transparent to the user of the mobile terminal 120 by informing that the file to be uploaded actually is taken care of, which is a relief for the user of the mobile terminal 120.

Action 306

The buffering module 130 then estimates the time to any one or more out of: upload start and upload end, of the file.

The buffering of the file in a queue among any other files to be uploaded for any mobile terminal may be based on any one or more out of: a first-in-first-out mechanism, a content of the file to be uploaded, a size of the files to be uploaded, a number of upload of files already performed by the mobile terminal 120 in a given period of time, and a total size already uploaded by the mobile terminal 120 in a given period of time.

Action 307

The buffering module 130 then sends to the mobile terminal 120 a notification about the estimated time to any one or more out of: upload start and upload end of the file. As mentioned above, it makes the transfer further more transparent to the user of the mobile terminal 120 by informing about when the file actually will be uploaded, which is a relief for the user of the mobile terminal 120.

This enables the mobile terminal 120 to refrain from re-sending to the selected buffering module 130 the file to be uploaded in the communications network 100 until the estimated time to any one or more out of: upload start and upload end has expired.

Note that the notification in Action 305 may be sent together with the notification in Action 307.

Action 308

The buffering module 130 then uploads the file to the network 125 such as e.g. the Internet or the cloud. When the upload of the file is completed, the buffering module 130 may send to the mobile terminal 120, a notification that the upload is completed.

Figure 4:
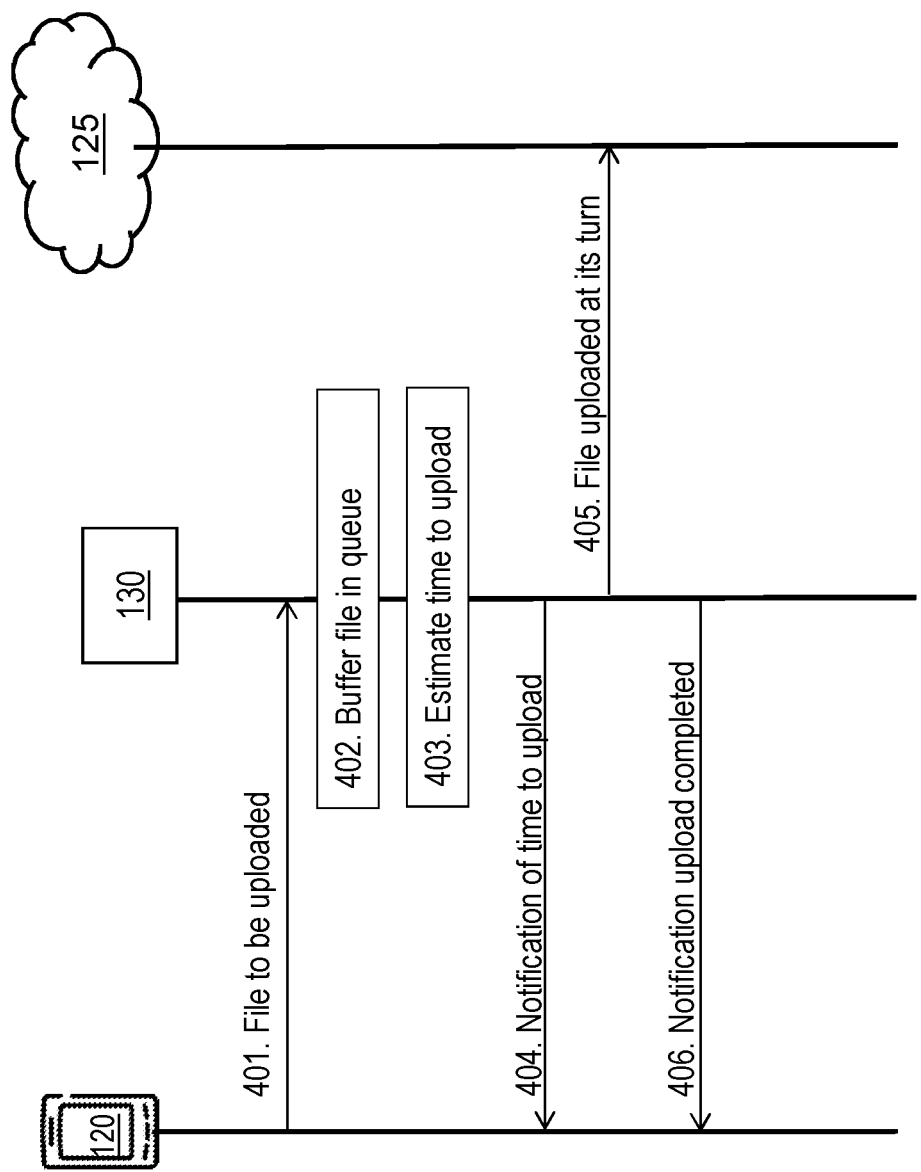
FIG. 4 is a sequence diagram depicting embodiments of a method in a communications network.

FIG. 4 is a sequence diagram illustrating an example process of buffering a file to a queue in an example scenario according to embodiments herein.

Action 401. The mobile terminal 120 sends a file to upload e.g. upload a photo to a social media page, to the buffering module 130 e.g. using a capillary network.

Figure 5:
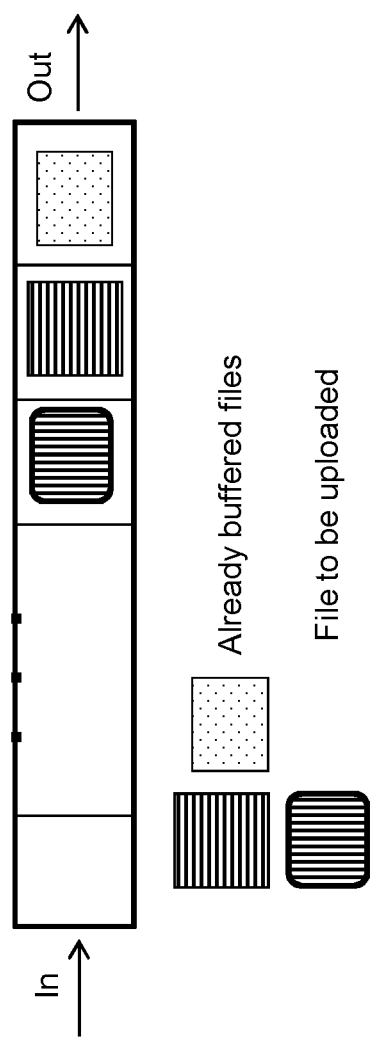
FIG. 5 is a schematic block diagram illustrating an embodiment.

Action 402. The buffering module 130 e.g. implemented in a gateway receives the file. The buffering module 130 buffers the file temporarily in a queue. The queue may be implemented using FIFO scheduling policy, where the first buffered file is uploaded before the second buffered file and so on see FIG. 5. More sophisticated scheduling policies may be applied, which is described in a subsection below.

Action 403. The buffering module 130 estimates the time to start and or end of uploading the file depending upon any one or more out of: the file size, the optimization technique applied on it, network congestion conditions, and the number of already buffered filed into the queue. Already buffered files may be uploaded before the current file using FIFO order.

Action 404. The buffering module 130 notifies the mobile terminal 120 about the estimated time required to upload the file such as e.g. Estimated upload start: X and Estimated upload end: Y.

Action 405. The file is uploaded at its turn in the queue, after all already buffered files.

Action 406. After file uploading, a notification may be sent to the mobile terminal that "the file is uploaded successfully". In case of some problem with the upload of the file, the mobile terminal 120 may be requested to resent the file to be uploaded to the buffering module 130 again and the procedure starts from Action 401 again.

As mentioned above, the buffering module 130 may be implemented using distributed methods as well to increase the functionality, efficiency and reliability.

Note that there may be multiple file optimizations techniques available/implemented for Action 403.

It is assumed that the mobile terminal 120 knows that the uplink traffic with the file to be uploaded shall go through the buffering module 130, and not using the usual procedure where the mobile terminal 120 would connect to a congested radio base station through a long range radio link. Some examples below describe mechanisms for the buffering module 130 to be discovered by the mobile terminal 120:

The mobile terminal 120 may use a specific application for performing the transparent upload, which may have a number of preconfigured buffering modules such as the buffering module 130 in different geographical locations, for example, at large stadiums and arenas. The application may use Location-Based Services (LBS) that are widely used in social networking today and are accessible with mobile terminals through a wireless network. LBS are a general class of computer program-level services that use location data to control features These services use information on the geographical position of the mobile terminal such as control plane locating, GSM localization, self-reported positioning, Local Positioning Systems, Indoor positioning systems etc. The application in the mobile terminal 120 selects a buffering module such as the buffering module 130 in the closest geographical proximity. The application in the mobile terminal 120 then uses a short range communication capillary network to upload the file to the buffering module 130.

In case no buffering module is pre-provisioned or pre-configured, the buffering module has not been previously configured/selected by the mobile terminal 120 for support, in the application in the mobile terminal 120, the mobile terminal 120 may search for an available buffering module, by broadcasting a signal such as e.g. by sending a beacon signal through a short range connectivity, e.g. a capillary network such as Bluetooth or WiFi.

According to embodiments herein, it may be provided a first-in-first-out mechanism for buffering the files to be uploaded. Note that more sophisticated mechanisms are possible. One example may be when a mobile terminal is trying to upload a number of large videos in a row, and another mobile terminal is trying to upload one picture. The picture upload may get higher priority than a sequence of videos from the first mobile terminal. In general, the priority of a piece of content in the queue may depend on its size, the number of upload already performed by a mobile terminal in a given period of time, and the total size already uploaded by the mobile terminal in a given period of time.

Embodiments herein provide a transparent file transfer to the mobile terminal 120 by buffering files in an intermediary step, and uploading the files one by one to tackle a network congestion. Further, proper notifications are provided to the mobile terminal 120 about the time required uploading the file, which offer a psychological relief to the user of the mobile terminal 120 and stops the user of the mobile terminal 120 to resend the file again and again.

Figure 6:
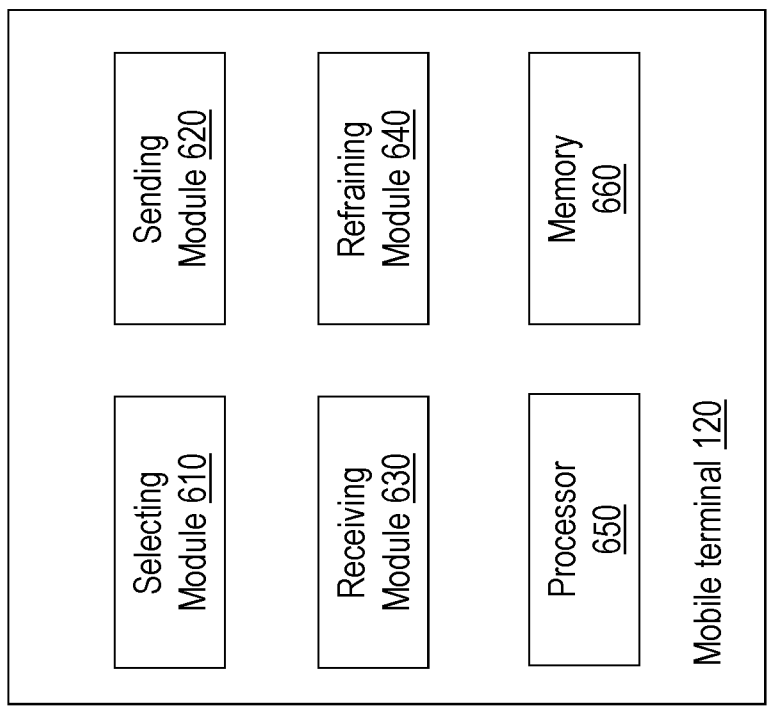
FIG. 6 is a schematic block diagram illustrating embodiments of a mobile terminal

To perform the method actions for uploading a file in a communications network 100, the mobile terminal 120 may comprise the following arrangement depicted in FIG. 6. As mentioned above, the mobile terminal the buffering module 130 may operate in the in mobile terminal 120. In some other embodiments, buffering module 130 operates in the communications network 100.

The mobile terminal 120 is configured to, e.g. by means of a selecting module 610 configured to, select a buffering module 130 to be used for uploading the file.

The mobile terminal 120 may be configured to, e.g. by means of the selecting module 610 further configured to, select the buffering module 130 when the communications network 100 is congested.

In some embodiments, the mobile terminal 120 is arranged to comprise a specific application for uploading files, which application is associated with a number of pre-configured buffering modules in different geographical locations. In these embodiments, the mobile terminal 120 may be configured to, e.g. by means of the selecting module 610 further configured to, select the buffering module 130 to be used for uploading the file by activating the specific application and selecting the buffering module 130 in the closest geographical proximity.

In some embodiments, the mobile terminal 120 may be configured to, e.g. by means of the selecting module 610 further configured to, select the buffering module 130 to be used for uploading the file by sending a broadcast signal to be heard and responded to by buffering module 130.

In some embodiments, the buffering module 130 operates in the communications network 100. In these embodiments, the mobile terminal 120 may further be configured to send to the selected buffering module 130, the file to be uploaded in the communications network 100, via a capillary network.

The mobile terminal 120 is further configured to, e.g. by means of a sending module 620 configured to, send to the selected buffering module 130, the file to be uploaded in the communications network 100.

The mobile terminal 120 is further configured to, e.g. by means of a receiving module 630 configured to, receive from the selected buffering module 130, a notification about an estimated time to any one or more out of: upload start and upload end.

The mobile terminal 120 may further be configured to, e.g. by means of the receiving module 630 further configured to, to receive from the selected buffering module 130, a notification about any one or more out of: an acknowledgement that the file to be uploaded is received, and that the file is now put into the queue.

The mobile terminal 120 may further be configured to, e.g. by means of the receiving module 630 further configured to, when the upload of the file is completed receive from the selected buffering module 130, a notification that the upload is completed.

The mobile terminal 120 is further configured to, e.g. by means of a refraining module 640 configured to, refrain from re-sending to the selected buffering module 130 the file to be uploaded in the communications network 100 until the estimated time to any one or more out of: upload start and upload end has expired.

The embodiments herein may be implemented through one or more processors, such as a processor 650 in the mobile terminal 120 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the mobile terminal 120. One such carrier may be in the form of a CD ROM disc. It is however feasible with other data carriers such as a memory stick. The computer program code may furthermore be provided as pure program code on a server and downloaded to the mobile terminal 120.

The mobile terminal 120 may further comprise a memory 660 comprising one or more memory units. The memory 660 comprises instructions executable by the processor 650.

The memory 660 is arranged to be used to store e.g. information, applications, data, and configurations, to perform the methods herein when being executed in the mobile terminal 120.

In some embodiments, a computer program comprises instructions, which when executed by the at least one processor 650, cause the at least one processor 650 to perform actions according to any of the Actions 201-206.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the mobile terminal 120 described above may refer to a combination of analog and digital circuits, and/or one or more processors 650 configured with software and/or firmware, e.g. stored in the memory 660, that when executed by the one or more processors such as the processor 650 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
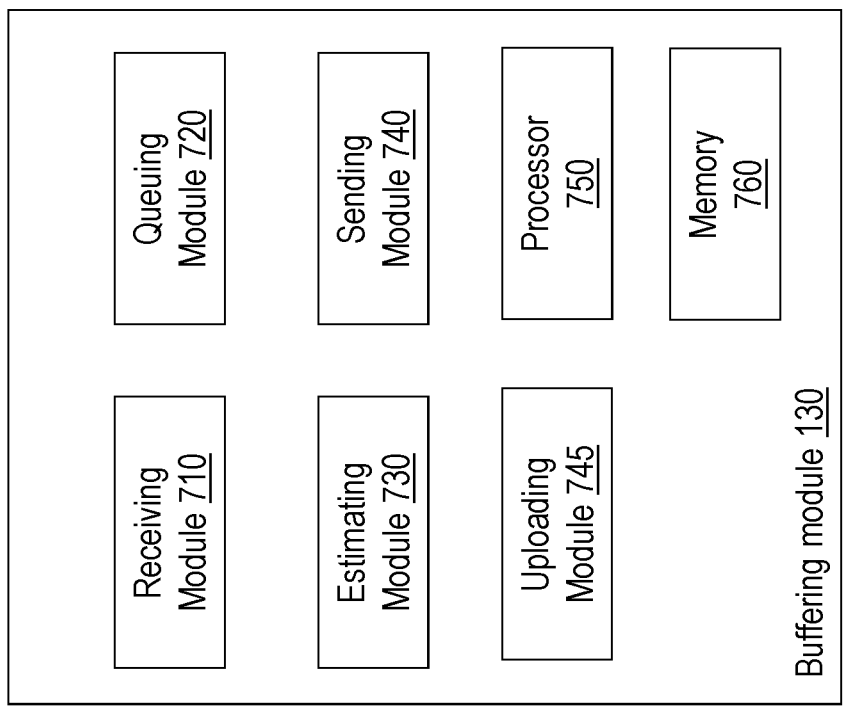
FIG. 7 is a schematic block diagram illustrating embodiments of a buffering module.

To perform the method actions for uploading a file in a communications network 100 for a mobile terminal 120, the buffering module 130 may comprise the following arrangement depicted in FIG. 7. As mentioned above the buffering module 130 may be operable in the in mobile terminal 120. In some alternative embodiments, the buffering module 130 may be operable in the communications network 100.

The buffering module 130 is configured to, e.g. by means of a receiving module 710 configured to, receive from the mobile terminal 120, a file to be uploaded in the communications network 100.

The file to be uploaded in the communications network 100 may be adapted to be received from the mobile terminal 120 when the communications network 100 is congested.

The buffering module 130 may be configured to receive from the mobile terminal 120, the file to be uploaded in the communications network 100, via a capillary network.

The buffering module 130 is further configured to, e.g. by means of a queuing module 720 configured to, buffer the file in a queue among any other files to be uploaded for any mobile terminal.

The buffering module 130 may further be configured to, e.g. by means of the queuing module 720 configured to, buffer the file in a queue among any other files to be uploaded for any mobile terminal based on any one or more out of: a first-in-first-out mechanism, a content of the file to be uploaded, a size of the files to be uploaded, a number of upload of files already performed by the mobile terminal 120 in a given period of time, and a total size already uploaded by the mobile terminal 120 in a given period of time.

The buffering module 130 is further configured to, e.g. by means of an estimating module 730 configured to, estimate time to any one or more out of: upload start and upload end, of the file.

The buffering module 130 is further configured to, e.g. by means of a sending module 740 configured to, send to the mobile terminal 120 a notification about the estimated time to any one or more out of: upload start and upload end of the file. This enables the mobile terminal 120 to refrain from re-sending to the selected buffering module 130 the file to be uploaded in the communications network 100 until the estimated time to any one or more out of: upload start and upload end has expired.

The buffering module 130 may further be configured to, e.g. by means of the sending module 740 configured to, send to the mobile terminal 120, a notification about any one or more out of: an acknowledgement that the file to be uploaded is received, and that the file is now put into the queue.

The buffering module 130 may further be configured to, e.g. by means of the uploading module 745 configured to, upload the file e.g. to the network 125 such as e.g. the internet or the cloud.

The buffering module 130 may further be configured to, e.g. by means of the sending module 740 configured to, when the upload of the file is completed, send to the mobile terminal 120 a notification that the upload is completed.

In some embodiments, the buffering module 130 is further configured to, e.g. by means of the receiving module 710 configured to, receive from the mobile terminal 120 a broadcast signal indicating a request that the mobile terminal 120 wishes to select a buffering module to be used for uploading the file.

In these embodiments, the buffering module 130 may further be configured to, e.g. by means of the sending module 740 configured to, send to the mobile terminal 120, an acknowledgement of the request.

The embodiments herein may be implemented through one or more processors, such as a processor 750 in the buffering module 130 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the buffering module 130. One such carrier may be in the form of a CD ROM disc. It is however feasible with other data carriers such as a memory stick. The computer program code may furthermore be provided as pure program code on a server and downloaded to the buffering module 130.

The buffering module 130 may further comprise a memory 760 comprising one or more memory units. The memory 760 comprises instructions executable by the processor 750.

The memory 760 is arranged to be used to store e.g. information, applications, data, and configurations, etc. to perform the methods herein when being executed in the buffering module 130.

In some embodiments, a computer program comprises instructions, which when executed by the at least one processor 750, cause the at least one processor 750 to perform actions according to any of the Actions 301-307.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the buffering module 130, described above may refer to a combination of analog and digital circuits, and/or one or more processors 750 configured with software and/or firmware, e.g. stored in the memory 760, that when executed by the one or more processors such as the processor 750 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a mobile terminal, for uploading a file from the mobile terminal to a targeted device or server, the method comprising:
   selecting a buffering module located in a capillary network in which the mobile terminal operates or located in a cellular radio network to which the capillary network is communicatively coupled via one or more gateway nodes, the cellular radio network providing communicative coupling to the targeted device or server;
   sending the file to the selected buffering module;
   receiving a notification from the selected buffering module, the notification indicating an estimated time of completion for the selected buffering module to upload the file to the targeted device or server; and
   in the absence of receiving a notification from the selected buffering module confirming completion of the upload of the file to the targeted device or server, waiting until at least the estimated time of completion before resending the file to the selected buffering module.

2. A method performed by a buffering module operating in a capillary network or in a cellular radio network accessible via the capillary network, the method comprising:
   receiving a file sent from a mobile terminal, the file sent by the mobile terminal for uploading to a targeted device or server, and where the cellular radio network provides communicative coupling to the targeted device or server;
   queuing the file in the buffering module, for uploading to the targeted device or server;
   determining an estimated time of completion for the buffering module to upload the file to the targeted device or server; and
   sending a notification to the mobile terminal, indicating the estimated time of completion.

3. A mobile terminal comprising:
   communication circuitry configured for wireless communication in a capillary network and a cellular radio network; and
   processing circuitry configured to:
      select a buffering module to be used for uploading a file to a targeted device or server, wherein the capillary network is communicatively coupled to the cellular radio network via one or more gateway nodes, wherein the cellular radio network provides communicative coupling to the targeted device or server, and wherein the selected buffering module resides in the capillary network or the cellular radio network;
      send the file to the selected buffering module;
      receive a notification from the selected buffering module, the notification indicating an estimated time of completion for the selected buffering module to upload the file to the targeted server or device; and
      in the absence of receiving a notification from the selected buffering module confirming completion of the upload of the file to the targeted device or server, wait until at least the estimated time of completion before resending the file to the selected buffering module.

4. The mobile terminal according to claim 3, wherein the processing circuitry is configured to select and use the selected buffering module responsive to detecting, or receiving an indication of, congestion in the cellular radio network.

5. The mobile terminal according to claim 3, wherein the processing circuitry is configured to send the file to the selected buffering module via the capillary network, rather than via a direct radio link with a base station of the cellular radio network.

6. The mobile terminal according to claim 3, wherein the processing circuitry is configured to select the selected buffering module from among two or more selectable buffering modules, based on respective geographical proximities of the two or more selectable buffering modules relative to a current location of the mobile terminal.

7. The mobile terminal according to claim 3, wherein the processing circuitry is configured to select the selected buffering module by causing the mobile terminal to broadcast a beacon signal in the capillary network to identify one or more buffering modules available for use, and to select one of the one or more available buffering modules.

8. A buffering module configured for operation in a cellular radio network or a capillary network communicatively coupled to the cellular radio network, the buffering module comprising:
   communication circuitry; and
   processing circuitry configured to:
      receive, via the communication circuitry, a file to be uploaded to a targeted device or server that is accessible via the cellular radio network, the file originating from a mobile terminal operating in at least one of the cellular radio network and the capillary network;
      buffer the file in a queue of the buffering module, for uploading to the targeted device or server;
      determine an estimated time of completion, for uploading the file to the targeted device or server; and
      send, via the communication circuitry, a notification for the mobile terminal, indicating the estimated time of completion.

9. The buffering module according to claim 8, wherein the communication circuitry is configured for wireless communication in the capillary network, and wherein the buffering module receives the file via the capillary network and sends the notification via the capillary network.

10. The buffering module according to claim 8, wherein the communication circuitry is configured for wired or wireless communication with one or more nodes of the cellular radio network, for uploading the file to the targeted device or server via the cellular radio network.

11. The buffering module according to claim 8, wherein, via the communication circuitry, the processing circuitry is configured to:
   receive, from the mobile terminal, a broadcast signal indicating a request that the mobile terminal wishes to select the buffering module to be used for uploading the file; and
   send, to the mobile terminal, an acknowledgement of the request.

12. The buffering module according to claim 8, wherein the processing circuitry is configured to determine the estimated time to completion based on any one or more of: contents of the file, a size of the file, the depth of the queue, and network congestion conditions.

* * * * *